(12) United States Patent
Kiehne et al.

(10) Patent No.: US 7,101,605 B2
(45) Date of Patent: Sep. 5, 2006

(54) WHITE, BIAXIALLY ORIENTED POLYESTER FILM

(75) Inventors: Thorsten Kiehne, Wiesbaden (DE); Herbert Peiffer, Mainz (DE); Bodo Kuhmann, Runkel (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/684,179

(22) Filed: Oct. 10, 2003

(65) Prior Publication Data

US 2004/0081840 A1 Apr. 29, 2004

(30) Foreign Application Priority Data

Oct. 26, 2002 (DE) .............................. 102 49 907

(51) Int. Cl.
- B32B 27/08 (2006.01)
- B32B 27/20 (2006.01)
- B32B 27/26 (2006.01)
- B32B 27/30 (2006.01)
- B32B 27/36 (2006.01)

(52) U.S. Cl. ...................... 428/141; 428/480; 428/483; 428/910; 526/303.1; 526/307.4; 526/307.6; 526/317.1; 526/318.5; 264/288.4; 264/289.3; 264/289.6; 264/290.2

(58) Field of Classification Search ................ 428/480, 428/483, 522, 910, 212, 213, 215; 264/288.4, 264/290.2
See application file for complete search history.

(56) References Cited

U.S. PATENT DOCUMENTS

| | | | | |
|---|---|---|---|---|
| 3,753,769 A | * | 8/1973 | Steiner | ........................ 428/331 |
| 4,098,952 A | * | 7/1978 | Kelly et al. | .................. 428/483 |
| 4,214,035 A | * | 7/1980 | Heberger | ..................... 428/340 |
| 4,302,505 A | * | 11/1981 | Heberger | ..................... 428/341 |
| 4,302,506 A | * | 11/1981 | Heberger | ..................... 428/341 |
| 4,571,363 A | * | 2/1986 | Culbertson et al. | ......... 428/332 |
| 5,955,181 A | * | 9/1999 | Peiffer et al. | ................ 428/212 |

FOREIGN PATENT DOCUMENTS

| | | |
|---|---|---|
| EP | 0 144 948 A2 | 6/1985 |
| EP | 0 312 226 A1 | 4/1989 |
| EP | 0 605 130 A1 | 7/1994 |
| EP | 1 176 004 A1 * | 1/2002 |

OTHER PUBLICATIONS

Schmitz, Peter et al., "Films." Ullmann's Encyclopedia of Industrial Chemistry, 5th Ed., vol. A11 (1988), pp. 85-95, 108-110.*
Werner, Eberhard et al., "Polyester, Films." Encyclopedia of Polymer Science and Engineering, vol. 12 (1988), pp. 193-216.*

* cited by examiner

Primary Examiner—Vivian Chen
(74) Attorney, Agent, or Firm—ProPat, L.L.C.

(57) ABSTRACT

White, biaxially oriented polyester films which have a base layer B which comprises a thermoplastic polyester such as polyethylene terephthalate, and which comprise substantially only $TiO_2$ as a white pigment, whose R value is less than 43 daN/mm², whose $e_{max}$ ratio is less than 2.5 and at least one of whose two surfaces of the film has been provided with an acrylate-containing coating, are particularly tear-resistant and do not tend to delamination and are therefore suitable in particular as lid films for food containers, for example yoghurt cups. A process is described for producing the films.

20 Claims, No Drawings

WHITE, BIAXIALLY ORIENTED POLYESTER FILM

BACKGROUND OF THE INVENTION

The invention relates to a white, biaxially oriented polyester film having at least one base layer comprising a thermoplastic polymer and at least one acrylate-containing layer which is preferably applied to the film as an aqueous dispersion. The invention further relates to a process for producing the film and to its use.

An example of a known use of white-colored, biaxially oriented polyester films is as lids for yoghurt cups. They are used there as an alternative to aluminum films. Such lids are printed and embossed on the outer side and provided on the inner side with a varnish or hotmelt, which sticks the lids to the cups. To improve the shelf life of the yoghurt, both the cup and the lid have to ensure adequate light protection. This is generally provided by coloring the lid with suitable pigments. A further requirement on the lid film is that, when it is removed from the cup, it neither delaminates nor starts and continues to tear. The film obtains the properties required for this purpose by the biaxial stretching and by an appropriately large thickness. The mechanical properties of the film (stiffness, puncture resistance, tear propagation resistance) improve greater than proportionally with the thickness of the film. For use as lids for yoghurt, useful polyester film thicknesses have been found to be from 50 to 90 µm. The thickness of the film cannot be as large as desired, since the material costs grow with the thickness and the sealing cycle times decrease, which is undesirable from an economic point of view. There is an observable trend to lower thicknesses.

Lids of Polyester Films Have a Series of Advantages:

The lid has a smooth, very shiny surface which guarantees excellent color reproduction and therefore has a very pleasing visual appearance.

Compared to conventional material, the film has a puncture resistance which is up to 700% higher, which has the consequence of significantly higher product protection.

The lid is easy to open, without fragments of the lid remaining on the cup, as is observed in the case of conventional materials, for example aluminum films. This property in particular is valued by the consumer.

The complete separation of cup and lid is of great advantage for the recyclability of the two materials. The lid film consists of thermoplastic polyester which has excellent recyclability. The product is therefore environmentally friendly. Moreover, the polyester film, as a consequence of its high stiffness and its good gliding ability (in accordance with the requirement profile, the film has low frictional coefficients), has outstanding processability for use as a lid.

In addition, the lid is absolutely free of metal. This guarantees very high reliability in metal detection, which is ever more frequently used in the production of foods. It is therefore possible with the method to determine the proportion of metallic constituents present in the contents with high precision.

Processors use certain criteria for the further processing of the films to produce yoghurt cups. The testing parameters which are customarily used in the production of lid films are the R value and the $e_{max}$ ratio. The R value can be reported as a measure of the orientation and is measured in the middle of the film web directly after production of the film. The $e_{max}$ ratio describes the orientation distribution over the web breadth (known as the "bow") and is likewise measured in the production of the film, but at discrete intervals over the entire breadth of the film web (cf. under measurement methods). In the case of transparent films (not the white films of the present context), the R values are in the range from 42 to 48 and the $e_{max}$ values in the range from 2.2 to 2.8. Investigations have shown that these values cannot be transferred from transparent films to the present white films. When the above-specified values are observed for white film, this generally leads to delamination of the film. The film delaminates internally, it tears in the thickness direction, the tear destroys the film and the film continues to tear.

The abovementioned properties are not attained in their entirety by the films known from the prior art. For example, EP-A-0 605 130 describes a multilayer film for use as a lid which has at least one opaque layer of crystalline polyester and at least one transparent layer of crystalline polyester. The film is also described by a deformation index which should be $\geq 2.5\%$. In addition, the film can be coated with certain substances, which improves the adhesion to printing inks and/or lacquers. Suitable substances which are listed are certain acrylates. There is no information about the R values and the $e_{max}$ ratio of the film. A film reproduced in accordance with EP-A-0 605 130 (example 1, longitudinal stretching temperature approx. 80° C., stretching ratio in the longitudinal stretching 3.3) delaminated, and also exhibited poor processing behavior, since the film curled after punching to give the lids.

From an economic point of view, it is necessary to permanently reduce the costs for the production of the lid film. An important handle for this purpose is the thickness of the film. A low thickness of the film is accompanied directly by a reduction in the material costs and, as a consequence of shorter sealing cycle times, leads to higher fill rates. However, the thickness of the lid cannot be reduced as far as desired, since this leads to processing and handling problems. Lids of polyester film having too low a thickness have a tendency to tear and to delaminate. There is then no longer any product security nor the advantage of 100% separation of lid and cup. The more pigments and the larger the pigments incorporated into the polyester film, the greater the risk of tearing and of delamination of the lid. Pigments, especially when they are relatively coarse, form weak points in the film at which the destruction of the film begins when it is removed from the cup.

In addition, it is advantageous when the film receives a coating which improves the ability of the film to slip, enables better adhesion to printing inks, adhesives (e.g. hotmelts) and sealing varnishes, but moreover does not change the other properties of the film, for example its optical properties. This is an important point, in particular for possible use of its own regrind in the production of the film, said regrind inevitably containing the coating material.

It is therefore an object of the invention to provide a white, biaxially oriented polyester film, in particular for use as a lid, which features improved properties compared to the polyester films established on the market. In particular, the novel polyester films should feature the following combination of properties:

economic producibility, good windability, good processability;

good adhesion of at least one film side to inks, adhesives, sealing varnishes;

very good removal behavior from the cup, no delamination, no commencement nor propagation of tearing;

good optical properties, especially even when its own regrind has been added in the course of film production, and good light protection properties.

Attempts to provide a conventional transparent film with the desired combination of properties by addition of pigments failed. The film delaminated on removal from the yoghurt cup.

BRIEF DESCRIPTION OF THE INVENTION

The object is achieved by a white, biaxially oriented polyester film which has a base layer B which comprises a thermoplastic polyester, wherein the R value of the film is smaller than 43 daN/mm$^2$, the $e_{max}$ ratio of the film is smaller than 2.5, and at least one of the two surfaces of the film has been provided with a continuous, crosslinked, acrylate-containing coating.

DETAILED DESCRIPTION OF THE INVENTION

The film preferably comprises substantially only TiO$_2$ as filler or white pigment, which is in turn preferably added to the polymer as an extrusion masterbatch.

The base layer B preferably comprises at least 80% by weight of the thermoplastic polyester, based on the total weight of this layer.

The acrylate-containing layer according to the invention is preferably applied to one or both film surfaces as an aqueous dispersion.

It has been found that the preferred use of substantially TiO$_2$ as the coloring pigment makes the film less prone to tearing and delamination. The addition of the TiO$_2$ preferably via masterbatch technology has the advantage that color differences, for example as a result of inconstant regrind properties, can be relatively easily corrected. When TiO$_2$ is used as the sole pigment, the film becomes particularly smooth and therefore more shiny, but has a tendency to blocking. The winding properties of the film may deteriorate.

This disadvantage is compensated for by coating at least one of the two film surfaces with a continuous crosslinked acrylate-containing layer which is preferably applied to the film as an aqueous dispersion. It has surprisingly been found that the use of this crosslinked, acrylate-containing coating to at least one film surface distinctly improves both the roll formation and the processability of the film, without worsening the outstanding optical properties of the film. It has further been found that, unexpectedly, the outstanding optical properties of the film are not reduced when the regrind occurring in the film production (this may contain portions of the acrylic coating) is incorporated into the basis layer of the film as its own regrind.

The R value of the film is determined in the middle of the film web directly after the production of the film. The $e_{max}$ ratio is likewise determined directly after the production of the film, but at discrete intervals over the entire breadth of the film web.

According to the invention, the film features a low R value. The R value is a measure of the orientation of the film and, in the case of the present invention, replaces the otherwise customary orientation measures Δn or Δp. These can only be measured in the case of a transparent film, but not in the case of the present white film.

The R value of the film is measured in the middle of the film web at an angle of 45° to the machine direction (MD), once on the right hand side of MD and the second time on the left hand side of MD (see measurement methods). This method takes into account that, in the case of yoghurt lids, the film is typically removed from the cup at an angle of 45° to the machine direction.

The lid is produced (printing, punching) by working from the roll. The roll direction (=web direction) of the film corresponds to MD. The film web is printed in such a way that the lids to be punched out lie exactly in MD or exactly in TD (TD=90° to MD). It follows that the removal direction of the lid always coincides with the 45° angle to MD. For this reason, it is necessary to determine the R value at 45° to the MD.

It has been found that the smaller the R value of the film, the more favorable, i.e. less significant, the tear commencement and tear propagation behavior of the lid. The tendency of the film to delaminate is then very low. The R value of the film of the present invention is preferably less than 43 daN/mm$^2$, in particular less than 42 daN/mm$^2$ and more preferably less than 40 daN/mm$^2$. It has been found that otherwise (R value greater than 43 daN/mm$^2$), the film is more prone to tearing and delamination. This disadvantage then has to be made good via a considerably greater thickness of the film.

In addition, the film of the present invention features a low $e_{max}$ ratio. The $e_{max}$ ratio is measured at defined intervals over the entire web breadth of the machine roll. This is again done at an angle of 45° to MD, once on the right hand side of MD and the second time on the left hand side of MD (see measurement methods). In the center of the film web, the $e_{max}$ ratio is close to one and generally increases with increasing proximity to the film edges. The $e_{max}$ ratio describes the properties of the film over the breadth of the roll, in particular the change in the properties relative to the middle of the film web. The lower the $e_{max}$ ratio, i.e. the more uniform the film properties over the breadth, the better the application prerequisites.

The $e_{max}$ ratio of the film according to the invention is preferably less than 2.5, in particular less than 2.2 and more preferably less than 2.0. Otherwise ($e_{max}$ ratio greater than 2.5), the film is more prone to tearing and delamination. This disadvantage then has to be made good via a greater thickness of the film, which is uneconomic.

The film according to the invention generally has a single-layer construction and thus consists of base layer B and the acrylate-containing coating. However, it may alternatively have a multilayer construction. In this case, it has been found to be advantageous to make the layer construction of the film symmetrical.

Advantageous embodiments of multilayer films are, for example, ABA or ACBCA, in which A are the outer top layers, C are the intermediate layers and B is the base layer.

The base layer B of the film consists of at least 80% by weight, preferably of at least 85% by weight and more preferably of at least 90% by weight, of a thermoplastic polyester. Suitable for this purpose are polyesters of ethylene glycol and terephthalic acid (=polyethylene terephthalate, PET), of ethylene glycol and naphthalene 2,6-dicarboxylic acid (=polyethylene 2,6-naphthalate, PEN), of 1,4-bishydroxymethylcyclohexane and terephthalic acid [=poly (1,4-cyclohexanedimethylene terephthalate, PCDT)], and also of ethylene glycol, naphthalene 2,6-dicarboxylic acid and biphenyl-4,4'-dicarboxylic acid (=polyethylene 2,6-naphthalate bibenzoate, PENBB). Particular preference is given to polyesters which consist of at least 90 mol %, in particular of at least 95 mol %, of ethylene glycol and terephthalic acid units or of ethylene glycol and naphthalene 2,6-dicarboxylic acid units. The remaining monomer units stem from other aliphatic, cycloaliphatic or aromatic diols, or other dicarboxylic acids. The base layer preferably consists of PET.

Suitable other aliphatic diols are, for example, diethylene glycol, triethylene glycol, aliphatic glycols of the general formula HO—$(CH_2)_n$—OH where n is an integer from 3 to 6 (in particular propane-1,3-diol, butane-1,4-diol, pentane-1,5-diol and hexane-1,6-diol) or branched aliphatic glycols having up to 6 carbon atoms. Of the cycloaliphatic diols, mention should be made of cyclohexanediols (in particular cyclohexane-1,4-diol). Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —$SO_2$—. In addition, bisphenols of the formula HO—$C_6H_4$—$C_6H_4$—OH are very suitable.

Other aromatic dicarboxylic acids are preferably benzenedicarboxylic acids, naphthalenedicarboxylic acids (for example napthalene-1,4- or 1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the $(C_3–C_{19})$-alkanedioic acids are particularly suitable, and the alkane moiety may be straight-chain or branched.

In addition to polyesters, the base layer B may comprise other thermoplastic polymers, additives and pigments. Suitable other thermoplastic polymers are, for example, aliphatic and aromatic polyamides, polyolefins and cyclic olefin copolymers (COC). Suitable additives and pigments are described further down.

The polyesters can be prepared, for example, by the known transesterification processes. The starting materials are dicarboxylic esters and diols which are reacted with the customary transesterification catalysts, such as zinc, calcium, lithium, magnesium and manganese salts. The intermediates are then polycondensed in the presence of generally customary polycondensation catalysts such as antimony trioxide or titanium salts. The preparation is equally efficient by the direct esterification process in the presence of polycondensation catalysts. This starts directly from the dicarboxylic acids and the diols.

For any outer layer A present or for any intermediate layers C present, it is possible in principle to use the same polymers as have already been described for the base layer B.

To achieve the aforementioned properties, in particular the desired whiteness of the film, the necessary pigments are incorporated into the base layer B, but possibly even instead or additionally into other layers present. Suitable pigments are, for example, titanium dioxide, calcium carbonate, barium sulfate, zinc sulfide or zinc oxide. Preference is given to using $TiO_2$ as the sole coloring pigment. Preference is given to adding it to the original raw material as an extrusion masterbatch (the titanium dioxide concentration here is distinctly higher than in the biaxially oriented film). Typical values for the $TiO_2$ concentration in the extrusion masterbatch are 50% by weight of titanium dioxide. The titanium dioxide may either be of the rutile type or of the anatase type. Preference is given to using titanium dioxide of the rutile type. The grain size of the titanium dioxide is generally between 0.05 and 0.5 μm, preferably between 0.1 and 0.3 μm. The incorporated pigments impart a brilliant white appearance to the film. In order to attain the desired whiteness (>60) and the desired low transparency (<60%), the base layer should be highly filled. The particle concentration to attain the desired low transparency is above 3% by weight but below 20% by weight, preferably above 4% by weight but below 18% by weight and most preferably above 5% by weight but below 16% by weight, based on the total weight of the layer containing them.

For a further increase in the whiteness, suitable optical brighteners can be added to the base layer and/or to the other layers. Suitable optical brighteners are, for example, Hostalux® KS or Eastobritee® OB-1.

Both the base layer and other layers present may additionally contain customary additives, for example stabilizers. They are typically added to the polymer or to the polymer mixture before melting. The stabilizers used are, for example, phosphorus compounds such as phosphoric acid or phosphoric esters.

The thickness of the polyester film of the present invention may vary within wide limits. It is preferably from 10 to 120 μm, in particular from 15 to 105 μm, preferably from 20 to 80 μm, the base layer having a proportion of preferably from 50 to 100% of the total thickness.

According to the invention, at least one side (surface) of the foil has been coated with an aqueous dispersion. The coating on the finished film has a thickness of from approx. 5 to 1000 nm, preferably from 10 to 500 nm, in particular from 20 to 200 nm. The coating is preferably applied inline, i.e. during the film production process, appropriately before the transverse stretching. The coating is more preferably applied by means of the reverse gravure-roll coating method in which the coatings can be applied highly homogeneously in layer thicknesses up to 200 nm. Preference is likewise given to applying the coating by the Meyer rod method, which can achieve relatively large coating thicknesses. The coating is preferably applied as a solution, suspension or dispersion, more preferably as an aqueous solution, suspension or dispersion. The coating mentioned confers on the film surface and the film the desired functions (low coefficient of sliding friction, good processability, good roll formation, low static charge, better printability and bondability) and possible further functions. For example, this may provide the film with an improved aroma barrier or make possible adhesion to materials which would otherwise not adhere to the film surface (for example photographic emulsions).

The substances/compositions mentioned are applied to one or both sides of the film as a dilute solution, emulsion or dispersion, preferably as an aqueous solution, emulsion or dispersion, and then the solvent/the dispersant is volatilized. When the coating is applied in line before the transverse stretching, the temperature treatment in the transverse stretching and the subsequent heat fixing are generally sufficient to volatilize the solvent/the dispersant and dry the coating.

The solid constituent present in the aqueous dispersion is acrylic copolymers. The copolymers used with preference consist substantially of at least 50% by weight of one or more polymerized acrylic and/or methacrylic monomers and of from approx. 1 to 15% by weight of copolymerizable comonomers which, in the copolymerized state, are capable of forming intermolecular crosslinks under the action of elevated temperature, optionally with the addition of a special resinous crosslinking agent. The acrylic copolymers may in principle also contain further monomer units.

The acrylic component of the copolymers is preferably present in an amount of from 50 to 99% by weight and preferably consists of an ester of methacrylic acid, in particular an alkyl ester whose alkyl group contains up to ten carbon atoms, for example the methyl, ethyl, n-propyl, isopropyl, n-butyl, isobutyl, tertiary butyl, hexyl, 2-ethylhexyl, heptyl and n-octyl group. Acrylic copolymers which are derived from a lower alkyl acrylate ($C_1$ to $C_4$), in particular ethyl acrylate, together with a lower alkyl methacrylate, provide particularly good adhesion between the polyester film and reprographic coatings and matt coatings applied thereto. Very particular preference is given to using adhesion promoter copolymers of an alkyl acrylate, e.g. ethyl acrylate or butyl acrylate, together with an alkyl methacrylate, e.g. methyl methacrylate, in particular in equal molar proportions and in a total amount of from approx. 70 to 95% by weight. The acrylate comonomer of such acrylic/methacrylic combinations is preferably present in a proportion of from 15 to 65 mol % and the methacrylate comonomer preferably in a proportion which is generally from 5 to 30 mol % greater than the proportion of the acrylate comonomers. The methacrylate is preferably present in the combination in a proportion of from 35 to 85 mol %.

Comonomers which are suitable in accordance with the invention and are also used to increase the solvent resistance and intermolecular crosslinking of the coating are, for example, N-methylolacrylamide, N-methylolmethacrylamide and the corresponding ethers; epoxide materials, for example glycidyl acrylate, glycidyl methacrylate and allyl glycidyl ether; carboxyl group-containing monomers, for example crotonic acid, itaconic acid or acrylic acid; anhydrides, for example maleic anhydride; hydroxyl group-containing monomers, for example itaconic anhydride; hydroxyl group-containing monomers, for example allyl alcohol and hydroxyethyl or hydroxypropyl acrylate or methacrylate; amides, for example acrylamide, methacrylamide or maleamide and isocyanates, for example vinyl isocyanate or allyl isocyanate. Of the abovementioned crosslinking comonomers, preference is given to N-methylolacrylamide and N-methylolmethacrylamide, and primarily because copolymer chains which contain one of these monomers are capable of condensing with each other and thus of forming the desired intermolecular crosslinks under the action of elevated temperatures. However, the solvent resistance which is desired in some cases of the preferred acrylate coating can also be achieved by the presence of an extraneous crosslinking agent, for example a melamine- or urea-formaldehyde condensation product. When no solvent resistance is required, crosslinking agent can be dispensed with.

The above-described inventive coating is illustrated in detail in EP-A-0 144 948, which is explicitly incorporated at this point by way of reference (cf. in particular page 5 to page 17). This document also gives information about further specific combinations of such mixed acrylic copolymers, which are not reproduced here but are explicitly encompassed by the invention.

This coating can be applied to one or both sides of the film (surface). However, it is also possible to provide only one side of the film with the coating according to the invention and to apply another coating to the other side. The coating composition may contain known additives, for example antistats, wetting agents, surfactants, pH regulators, antioxidants, dyes, pigments, antiblocking agents, for example colloidal $SiO_2$, etc. It is normally appropriate to incorporate a surfactant, in order to increase the ability of the aqueous coating to wet the polyester backing film.

A particular advantage of the invention is that the production costs of the film according to the invention are only insignificantly above those of a standard polyester raw material film. The properties of the film according to the invention which are relevant to processing and use are distinctly improved compared to prior art films.

In addition, it is guaranteed that, when the film is produced, the regrind can be reused in a proportion of up to approx. 60% by weight, preferably from 10 to 50% by weight, based in each case on the total weight of the film, without the physical properties of the film being significantly adversely affected.

The present invention also provides a process for producing films according to the invention. It comprises
  the production of a single- or multilayer film composed of a base layer B and optionally outer layer(s) A (and C) by coextrusion and shaping the melts to give flat melt films,
  coating the film with the layer which crosslinks via acrylic compounds (preferably between the first and the second stretching step),
  biaxial stretching of the film and heat-setting of the stretched film.

First, the polymers or the polymer mixture of the individual layers is compressed in an extruder and liquefied. The melt(s) is (are simultaneously) forced through a slot die, and the extruded (multilayer) film is drawn off on one or more takeoff rolls, in the course of which it cools and solidifies.

The biaxial stretching is generally carried out sequentially. Preference is given to stretching first in the longitudinal direction (i.e. in machine direction, MD) and then in transverse direction (i.e. at right angles to machine direction, TD). The stretching in the longitudinal direction can be carried out with the aid of two rolls running at different rates in accordance with the desired stretching ratio. For transverse stretching, an appropriate tenter frame is generally used.

The temperature at which the stretching is carried out may vary within a relatively wide range and depends on the desired properties of the film. The longitudinal stretching is carried out at from approx. 80 to 140° C. and the transverse stretching at from approx. 80 to 150° C. The longitudinal stretching ratio $\lambda_{MD}$ is preferably in the range from 2.0:1 to 5:1, in particular from 2.5:1 to 4.0:1. The transverse stretching ratio $\lambda_{TD}$ is generally in the range from 2.5:1 to 5.0:1, preferably from 3.0:1 to 4.5:1. Preference is given, before the transverse stretching, to coating one or both surfaces of the film with the above-described acrylate by the known methods.

For the preparation of a film having very good removal and delamination behavior (the film must not delaminate when removed), it has been found to be advantageous when the R value of the film is less than 43 daN/mm$^2$ and the $e_{max}$ ratio is less than 2.5. In this case, the integrity of the film in the thickness direction is so great than when the lid is removed from the cup, the film definitely does not delaminate, nor start or continue to tear.

The important parameters which influence the R value and the $e_{max}$ value of the film are the process parameters in the longitudinal stretching and in the transverse stretching, and also the SV value of the raw materials used. The process parameters include in particular the stretching ratios in the longitudinal and transverse directions ($\lambda_{MD}$ and $\lambda_{TD}$), the stretching temperatures in the longitudinal and transverse directions ($T_{MD}$ and $T_{TD}$) and the film web speed.

When, for example, R values and $e_{max}$ ratios which are above the inventive values are obtained on a film plant, films according to the invention can be produced by increasing the temperatures in the longitudinal stretching and in the transverse stretching and/or reducing the stretching ratios in the longitudinal stretching and in the transverse stretching. Typical values for the parameters mentioned in the case of films which are not used for yoghurt cup lids are, for example,

|  | Longitudinal stretching | Transverse stretching |
|---|---|---|
| Stretching temperatures | 80 to 118° C. | 90 to 120° C. |
| Stretching ratios | 4.2 to 4.8 | 4.1 to 4.4 |

In the case of the films according to the invention, in contrast, the temperatures and stretching ratios are in contrast more preferably within ranges as reproduced by the table below.

|  | Longitudinal stretching | Transverse stretching |
|---|---|---|
| Stretching temperatures | 80 to 130° C. | 80 to 135° C. |
| Stretching ratios | 2.5 to 4.0 | 3.5 to 4.0 |

A further reduction in the stretching ratios is not advantageous, since the film might otherwise exhibit defects which are undesired. When, for example, the longitudinal stretching ratio is reduced below a value of 2.5, transverse creases are obtained in the film in some circumstances, which can be clearly seen.

When, for example, in the course of film production, a machine provides an R value of 50 daN/mm$^2$ with the set of parameters $\lambda_{MD}$=4.8 and $\lambda_{TD}$=4.0, the stretching temperatures in the longitudinal and transverse direction $T_{MD}$=80–115° C. and $T_{TD}$=80–125° C., increasing the longitudinal stretching temperature to $T_{MD}$=80–125° C. or increasing the transverse stretching temperature to $T_{TD}$=80–135° C. or reducing the longitudinal stretching ratio to $\lambda_{MD}$=4.0 or reducing the transverse stretching ratio to $\lambda_{TD}$=3.6 provides an R value of 38. It has been found that, surprisingly, these measures also result in an $e_{max}$ ratio within the inventive range. The web speed in this case was 140 m/min and the SV value of the film 730. In the case of longitudinal stretching, the temperatures relate to the roll temperatures and, in the case of the transverse stretching, to the film temperature which were measured by means of IR (infrared).

In the subsequent thermosetting, the film is held at a temperature of from approx. 150 to 250° C. for from about 0.1 to 10 s. Subsequently, the film is wound up in a customary manner.

As general instructions for attaining the inventive R value and the inventive $e_{max}$ ratio, an appropriate procedure is, starting from a set of parameters which provides the film with noninventive R values and $e_{max}$ ratios, to either:

increase the stretching temperature in MD by ΔT=3 to 15 K, preferably by ΔT=5 to 12 K and more preferably by ΔT=7 to 10 K, or reduce the stretching ratio in MD by Δλ=0.3 to 0.8, preferably by Δλ=0.35 to 0.7 and more preferably by Δλ=0.4 to 0.6, or increase the stretching temperature in TD by ΔT=4 to 15 K, preferably by ΔT=5 to 12 K and more preferably by ΔT=7 to 10 K, or reduce the stretching ratio in TD by Δλ=0.3 to 0.8, preferably by Δλ=0.35 to 0.7 and more preferably by Δλ=0.4 to 0.6.

Where appropriate, one or more of the above measures may also be combined with each other. It has been found to be particularly advantageous to combine the first two measures with each other.

Preference is given, after the biaxial stretching, to corona- or flame-treating one or both surfaces of the film by one of the known methods. The treatment intensity is generally above 50 mN/m.

The film according to the invention exhibits very good handling, very good winding properties and very good processing behavior. It also features outstanding removal behavior from the cup. In particular, the tendency of the film to start and continue to tear and to delamination is very low. The film according to the invention is therefore suitable as a packaging material for foods and other consumable items, in particular as a lid film for food containers, for example yoghurt cups.

In addition, the film of the present invention has outstanding optical properties, exhibits outstanding further processing properties and excellent roll formation. As a consequence of its very good handling and its very good processing properties, the film is suitable in particular for processing on fast-running machines. The film is also notable for an outstanding whiteness which additionally imparts to the film a very attractive appearance which is effective for advertising.

In the production of the film, it is guaranteed that the regrind which, for example, occurs as offcuts in the course of film production, can be added again to the extrusion in a concentration of from approx. 20 to 60% by weight, based on the total weight of the film, without significantly adversely affecting the physical properties of the film.

The table which follows (table 1) summarizes once again the most important film properties according to the invention.

TABLE 1

|  | Inventive range | Preferred | More preferred | Unit | Measurement method |
|---|---|---|---|---|---|
| R value | <43 | <42 | <40 | daN/mm$^2$ | as described |
| $e_{max}$ ratio | <2.5 | <2.2 | <2.0 | — | as described |
| Transparency | <60 | <55 | <50 | % | as described |
| Whiteness | >60 | >65 | >70 | % | as described |
| Thickness | 10–120 | 15–105 | 20–80 | μm |  |
| Friction of the coated side against itself (COF) | <0.45 | <0.42 | <0.40 | — | as described |
| Average roughness of the coated side | <50 | <45 | <40 | nm | DIN 4768, cut off of 0.25 mm |
| Gloss (20° measuring angle) | >50 | >55 | >60 | — | as described |
| Yellowness index | <50 | <45 | <40 | — | as described |
| Filler concentration of the base layer (White pigment) | >3 | >4 | >5 | % by wt. |  |

To characterize the raw materials and the films, the following measurement methods were used:

| | | |
|---|---|---|
| DIN | = | Deutsches Institut für Normung [German Institute for Standardization] |
| ASTM | = | American Society for Testing and Materials |

Transparency

The transparency is measured based on ASTM-D 1033-77.

Yellowness Index

The yellowness index of the film is determined to ASTM-D 1925-70 by means of a Perkin Elmer Lamda 12 spectrophotometer (USA), standard illuminant D65, 10° normal observer. The measured normal color values X, Y, Z were used to calculate the yellowness index YI by the equation $$YI=[100\cdot(1.28\cdot X-1.06\cdot Z)]/Y$$

Whiteness

The whiteness is determined according to Berger, by laying generally more than 20 film layers on top of one other. The whiteness was determined with the aid of the ELRE-PHO electrical remission photometer from Zeiss, Oberkochem (DE), standard illuminant C, 2° normal observer. The whiteness W is defined as $$W=RY+3RZ-3RX$$

where RX, RY, RZ are appropriate reflection factors where an X, Y, Z color measurement filter is used. The white standard used is a barium sulfate presscake (DIN 5033, Part 9). A detailed description is described, for example, in Hansl Loos, "Farbmessung", Verlag Beruf und Schule, Itzehoe (1989).

SV Value (Standard Viscosity)

The standard viscosity SV (DCA), based on DIN 53726, is measured in dichloroacetic acid. The intrinsic viscosity (IV) can be calculated from the standard viscosity as follows:

$$IV=[\eta]=6.907\cdot10^{-4}SV(DCA)+0.063096[dl/g]$$

Friction

The coefficient of sliding friction was determined to DIN 53 375. The coefficient of sliding friction was measured 14 days after the production.

Gloss

The gloss was determined to DIN 67 530. The reflector value was measured as a characteristic optical parameter for the surface of a film. Based on the standards ASTM-D 523-78 and ISO 2813, the angle of incidence was set to 20°. A light beam hits the flat test surface at the angle of incidence set and is reflected or scattered by it. The light beams incident on the photoelectric detector are displayed as a proportional electrical quantity. The measurement is dimensionless and has to be reported with the angle of incidence.

Determination of the R Value

The R value of the film is measured in the middle of the film web.

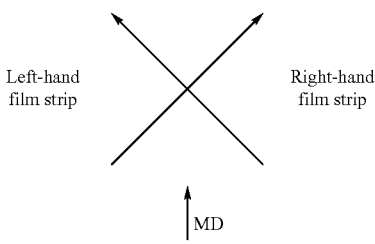

To this end, as the schematic diagram shows, 2 film strips of breadth 15 mm and length 200 mm (right and left) are each cut out of the middle of the film web at 45° to MD and clamped into a Zwick 010 tensile strain measuring instrument (Ulm, DE) and stretched. The R value is calculated on the basis of the following equation:

$$R \text{ value}=1/3\times(\sigma_{30\%}-\sigma_{0.2\%})[\text{measured in daN/mm}^2]$$

In this equation, the parameters $\sigma_{30\%}$ and $\sigma_{0.2\%}$ are defined as follows:

$\sigma_{30\%}$=strain in the film at 30% extension, measured at 45° to MD, once to the left and once to the right hand side of MD.

$\sigma_{0.2\%}$=strain in the film at 0.2% extension, measured at 45° to MD, once to the left and once to the right hand side of MD.

In the case of the film according to the invention, the R value of the film is less than:

R value<43 daN/mm², to the right and left hand side.

Determination of the $e_{max}$ Ratio

The $e_{max}$ ratio is measured over the entire breadth of the film web (over the breadth of the machine roll). The $e_{max}$ ratio is measured at an angle of 45° to MD, once to the right of MD and the second time to the left of MD. In the middle of the film web, the $e_{max}$ ratio is close to one and increases with increasing movement from the middle of the film web toward the film edges. The distance between two measuring points (in TD,=breadth direction of the film web) is typically 50 cm. As in the determination of the R value, 2 film strips of breadth 15 mm and length 200 mm are in this case also each cut out of the film web (left and right) each at 45° to MD. The specimens are then stretched in the tensile strain measuring instrument (see above). The $e_{max}$ ratio is calculated on the basis of the following equation:

$$e_{max} \text{ ratio}=\epsilon_{left}/\epsilon_{right} \text{ or } \epsilon_{right}/\epsilon_{left}$$

(which by definition is always >1)

$\epsilon_{left}$ is the tensile strain at break of the film at 45° to MD, left $\epsilon_{right}$ is the tensile strain at break of the film at 45° to MD, right.

By definition, the $e_{max}$ ratio is always greater than 1. In the case of the measurements over the film web breadth, it follows that the first relationship ($\epsilon_{left}/\epsilon_{right}$) holds for the first half of the web and the second relationship ($\epsilon_{right}/\epsilon_{left}$) holds for the second half of the web. In the case of the film according to the invention, the $e_{max}$ ratio of the film is less than:

$e_{max}$ ratio<2.5, right and left.

Assessment of the Removal Behavior of the Film from a Yoghurt Cup

The removal behavior of the film from the cup is assessed visually. In this testing method, the film (the lid) is coated with sealing vanish of the type HS-61-095 (Novacote, Hamburg, DE) using a laboratory coating instrument from RK Print-Coat Instruments (Royston, UK). The doctor blade used provided wet application at a thickness of 24 μm. The coated film was then dried at 25° C. for 24 hours. The film was then sealed to a polystyrene cup (internal diameter: 6.5 cm, external diameter including sealing edge: 7.3 cm) (PA 210 sealing apparatus from Packaging Automation Ltd., Knutsford, UK; sealing conditions: 150° C., 1 s). After a storage time (curing time) of 48 h, the film was removed by hand from the cup. The removal behavior was assessed as
++ (=good) when the film does not start to tear and/or delaminate in any of 10 attempts;
−− (=poor) when the film starts to tear and/or delaminate at least once in 10 attempts.

EXAMPLE 1

The coating according to the invention consists of an aqueous dispersion which comprises 4.5% by weight of a latex and also 0.2% by weight of sodium lauryl sulfate and 9.8% by weight of Triton X-405 (Fluka, Buchs, CH). The latex is a copolymer of 60% by weight of methyl methacrylate, 35% by weight of ethyl acrylate and 5% by weight of N-methylolacrylamide.

Polyethylene terephthalate chips were dried at 160° C. to a residual moisture content of less than 50 ppm and fed to the extruder for base layer B. Extrusion and subsequent stepwise orientation in the longitudinal direction provided a uniaxially oriented film which was corona-treated and coated with the above-described dispersion by means of the reverse gravure-roll coating method. The dry weight of the coating was approx. 0.035 g/m² (based on the biaxially stretched film), corresponding to a layer thickness of 25 nm. The film which had been longitudinally stretched in this way was stretched in the transverse direction to give a white, single-layer film having an overall thickness of 55 μm.

| Base layer B: | |
|---|---|
| 85% by weight | polyethylene terephthalate having an SV of 800 |
| 15% by weight | masterbatch from Sukano (Schindellegi, CH) comprising 50% by weight titanium dioxide (average titanium dioxide particle size approx. 0.3 μm). |

The preparation conditions in the individual process steps were:

| Longitudinal stretching: | temperature: | 80–125° C. |
|---|---|---|
| | longitudinal stretching ratio: | 3.4 |
| Transverse stretching: | temperature: | 80–135° C. |
| | transverse stretching ratio: | 4.0 |
| Setting: | temperature: | 230° C. |
| Time: | | 3 s |

A single-layer film was obtained which had very good optical properties, a low coefficient of sliding friction, very good processing performance and very good winding quality. The film exhibited the desired behavior on removal of the film from the cup. The film does not start to tear and exhibits no tendency to delaminate (table 2).

EXAMPLE 2

Example 1 was repeated, except that the process parameters were changed:

| Longitudinal stretching: | temperature: | 80–125° C. |
|---|---|---|
| | longitudinal stretching ratio: | 4.0 |
| Transverse stretching: | temperature: | 80–135° C. |
| | transverse stretching ratio: | 3.4 |
| Setting: | temperature: | 230° C. |
| Time: | | 3 s |

Under these conditions too, a film was obtained which had very good optical properties, a low coefficient of sliding friction, very good processing performance and very good winding quality. The film likewise exhibits the desired behavior on removal of the film from the cup. The film does not start to tear and exhibits no tendency to delaminate.

EXAMPLE 3

Example 1 was repeated, except that the thickness of the film was reduced from 55 μm to 36 μm. This comparatively thin film too features good processing performance, very good winding quality and the desired removal behavior of the film from the cup.

Comparative Example 1 (CE1)

In comparison to example 1, the process conditions were now changed:

| Longitudinal stretching: | temperature: | 80–118° C. |
|---|---|---|
| | longitudinal stretching ratio: | 4.0 |
| Transverse stretching: | temperature: | 80–125° C. |
| | transverse stretching ratio: | 4.0 |
| Setting: | temperature: | 230° C. |
| Time: | | 3 s |

The film did not exhibit the desired processing performance and in particular did not exhibit the desired behavior on removal of the film from the cup. The film starts to tear and exhibits a high tendency to delaminate.

Comparative Example 2 (CE2)

In comparison to example 1, the film was now not coated with any acrylic compound. The film did not exhibit the desired processing performance, it tended to block and did not have the required high winding quality.

The results of the examples/comparative examples are summarized in table 2.

TABLE 2

| Examples | Film thickness μm | Film web breadth m | R value daN/mm² | $e_{max}$ ratio | Friction of the coated side against itself | Roughness of the coated side nm | Transparency % | Whiteness % | Gloss at 20° | Yellowness index | Processing performance | Removal behavior of the film |
|---|---|---|---|---|---|---|---|---|---|---|---|---|
| Example 1 | 55 | 5 | 39 | 1.8 | 0.36 | 28 | 28 | 90 | 72 | 36 | ++ | ++ |
| Example 2 | 55 | 5 | 37 | 1.7 | 0.35 | 30 | 29 | 90 | 71 | 34 | ++ | ++ |
| Example 3 | 36 | 5 | 38 | 1.8 | 0.35 | 31 | 35 | 88 | 70 | 30 | ++ | ++ |
| CE1 | 55 | 5 | 50 | 2.7 | 0.36 | 30 | 28 | 90 | 72 | 36 | + | -- |
| CE2 | 55 | 5 | 39 | 1.7 | 0.48 | 32 | 28 | 90 | 72 | 36 | -- | ++ |

Processing performance
++ very good   + good
-- bad    - moderate

The invention claimed is:

1. A white, biaxially oriented polyester film which has a base layer B which comprises a thermoplastic polyester and pigment and/or filler consisting essentially of titanium dioxide, wherein the R value of the film is smaller than 43 daN/mm², the $e_{max}$ ratio of the film is smaller than 2.5, and at least one of the two surfaces of the film has been provided with a crosslinked continuous coating comprising resin consisting essentially of an acrylate copolymer, said acrylate copolymer consisting essentially of acrylic monomer residue, methacrylic monomer residue and further containing a copolymerized self-condensing comonomer residue forming intermolecular crosslinks, wherein antiblocking agents are absent from said coating and the coated side(s) of said film exhibits a sliding coefficient of friction of less than 0.45.

2. The polyester film as claimed in claim 1, wherein the R value of the film is smaller than 42 daN/mm², and the $e_{max}$ ratio of the film is smaller than 2.2.

3. The polyester film as claimed in claim 1, wherein the base layer B comprises at least 80% by weight of the thermoplastic polyester, based on the total weight of the layer.

4. The polyester film as claimed in claim 1, wherein the polyester contains units of ethylene glycol and terephthalic acid, and/or units of ethylene glycol and naphthalene-2,6-dicarboxylic acid.

5. The polyester film as claimed in claim 1, wherein the polyester used In the base layer B comprises polyethylene terephthalate.

6. The polyester film as claimed in claim 1, which is a single-layer film.

7. The polyester film as claimed in claim 1, which has a symmetrical layer structure ABA or ACBCA, where C are the intermediate layers and A are the outer layers of the film.

8. The polyester film as claimed in claim 1, wherein only the base layer B of the film has a white pigment or filler.

9. The polyester film as claimed in claim 1, which comprises more then 3% by weight, off white pigment, based on the total weight of the layer in which it is present.

10. The polyester film as claimed in claim 1, wherein the acrylic monomer is an alkyl acrylate, the methacrylic monomer is an alkyl methacrylate and the copolymerizable comonomer forming intermolecular crosslinks is selected from N-methylolacrylamide and N-methylolmethacrylamide.

11. The polyester film as claimed in claim 1, wherein the coating is applied in the form of an aqueous dispersion to one or both surfaces of the film.

12. The polyester film as claimed in claim 1, whose overall thickness is from 10 to 120 μm.

13. The polyester film as claimed in claim 1, having a yellowness index smaller than 40.

14. A process for producing a polyester film as claimed in claim 1, encompassing the steps of
   a) producing a single- or multilayer film by extrusion or coextrusion and shaping the melts to give flat melt films,
   b) coating the film with an acrylate-containing coating,
   c) biaxial stretching of the film, and
   d) heat-setting of the stretched film.

15. The process as claimed in claim 14, wherein the longitudinal stretching temperature is from 80 to 130° C., the transverse stretching temperature is from 80 to 135° C., the longitudinal stretching ratio is from 2.5 to 4.0, and the transverse stretching ratio is from 3.5 to 4.0.

16. A packaging film for foods and other consumable items formed from polyester film in accordance with claim 1.

17. Lidding film for cup-type containers formed from polyester film in accordance with claim 1.

18. A film according to claim 1, said coating further comprising one or more surfactants.

19. A white, biaxially oriented polyester film comprising a base layer B which comprises a thermoplastic polyester and pigment and/or filler consisting essentially of titanium dioxide, wherein the R value of the film is smaller than 43 daN/mm², the $e_{max}$ ratio of the film is smaller than 2.5, and at least one of the two surfaces of the film has been provided with a crosslinked continuous coating comprising resin consisting essentially of an acrylate copolymer consisting essentially of from about 35 to 68 mol % methylmethacrylate comonomer residue; an alkyl acrylate comonomer residue selected from ethyl acrylate or butyl acrylate and a residue of a self-condensing copolymerized comonomer forming intermolecular crosslinks selected from N-methylolacrylamide and N-methylolmethacrylamide, wherein the coated side(s) of said film exhibits a coefficient of sliding friction of less than 0.42 and antiblocking agents are absent from said coating.

20. A white, biaxially oriented polyester film comprising a thermoplastic polyester and pigment and/or filler, wherein the R value of the film is smaller than 43 daN/mm², the $e_{max}$ ratio of the film is smaller than 2.5, and at least one of the two surfaces of the film has been provided with a crosslinked continuous coating consisting of
  (i) an acrylate copolymer comprising acrylate comonomer residue, methacrylate comonomer residue and a copolymerized self-condensing comonomer residue forming intermolecular crosslinks,
  (ii) optional wetting agents;
  (iii) optional surfactants;
  (iv) optional pH regulators;
  (v) optional antioxidants; and
  (vi) optional dyes;
  wherein the coated side(s) of said film exhibits an average roughness of less than 50 nm and a sliding coefficient of friction of less than 0.45.

* * * * *

UNITED STATES PATENT AND TRADEMARK OFFICE
CERTIFICATE OF CORRECTION

PATENT NO.       : 7,101,605 B2                                                Page 1 of 1
APPLICATION NO.  : 10/684179
DATED            : October 10, 2003
INVENTOR(S)      : Kiehne et al.

It is certified that error appears in the above-identified patent and that said Letters Patent is hereby corrected as shown below:

Claims

Column 9
Claim 9, Line 59, delete "off" insert --of--

Signed and Sealed this

Twenty-eighth Day of November, 2006

JON W. DUDAS
*Director of the United States Patent and Trademark Office*